(12) United States Patent
Bordin et al.

(10) Patent No.: US 12,454,990 B2
(45) Date of Patent: Oct. 28, 2025

(54) GAS SPRING

(71) Applicant: SPECIAL SPRINGS S.R.L., Romano d'Ezzelino (IT)

(72) Inventors: Francesco Bordin, Romano d'Ezzelino (IT); Massimo Fiorese, Romano d'Ezzelino (IT); Mattia Todesco, Romano d'Ezzelino (IT)

(73) Assignee: SPECIAL SPRINGS S.R.L., Romano d'Ezzelino (IT)

( * ) Notice: Subject to any disclaimer, the term of this patent is extended or adjusted under 35 U.S.C. 154(b) by 354 days.

(21) Appl. No.: 17/714,343

(22) Filed: Apr. 6, 2022

(65) Prior Publication Data

US 2022/0325770 A1    Oct. 13, 2022

(30) Foreign Application Priority Data

Apr. 7, 2021   (IT) .................. 102021000008588

(51) Int. Cl.
| | | |
|---|---|---|
| *F16F 9/02* | (2006.01) | |
| *B21D 24/02* | (2006.01) | |
| *F16F 9/32* | (2006.01) | |
| *F16F 9/43* | (2006.01) | |
| *F16K 17/40* | (2006.01) | |

(52) U.S. Cl.
CPC ............ *F16F 9/0281* (2013.01); *B21D 24/02* (2013.01); *F16F 9/0218* (2013.01); *F16F 9/3242* (2013.01); *F16F 9/435* (2013.01); *F16K 13/04* (2013.01); *F16F 2222/126* (2013.01); *F16F 2228/001* (2013.01); *F16F 2230/0023* (2013.01); *F16F 2230/06* (2013.01); *F16F 2230/24* (2013.01); *F16F 2232/08* (2013.01)

(58) Field of Classification Search
CPC ........ F16F 9/0281; F16F 9/0218; F16F 9/435; F16F 9/3242; F16F 2222/126; F16F 2228/001; F16F 2230/0023; F16F 2230/006; F16F 2230/24; F16F 2232/08; B21D 24/02; F16K 13/04
See application file for complete search history.

(56) References Cited

U.S. PATENT DOCUMENTS

| 6,431,332 B1 * | 8/2002 | Phelizot ................. F16F 9/435 188/286 |
| 10,113,605 B2 * | 10/2018 | Cotter ................... F16F 9/0281 |

(Continued)

FOREIGN PATENT DOCUMENTS

| EP | 0427468 A1 | 5/1991 |
| EP | 1241373 A1 | 9/2002 |

(Continued)

*Primary Examiner* — Vishal R Sahni
(74) *Attorney, Agent, or Firm* — Leason Ellis LLP

(57) ABSTRACT

A gas spring comprising: a cup-shaped body; a movable piston which is inserted in an axially slidable manner in the cup-shaped body and is coupled to the cup-shaped body in a fluid-tight manner, so as to delimit a variable-volume closed chamber adapted to contain a pressurised gas; and a safety plug provided with a shank which extends in pass-through manner in the bottom wall of the cup-shaped body, and protrudes cantilevered within the cup-shaped body so that its distal end can be reached/struck by the movable piston in the case of overtravel; the distal end of the shank having a substantially tubular structure that directly communicates with the closed chamber.

18 Claims, 2 Drawing Sheets

(56) References Cited

U.S. PATENT DOCUMENTS

| | | | |
|---|---|---|---|
| 10,428,897 B2 * | 10/2019 | Goransson | F16F 9/0218 |
| 10,619,695 B2 * | 4/2020 | Fantinato | F16F 9/432 |
| 2018/0087595 A1 * | 3/2018 | Cotter | F16F 9/432 |
| 2018/0087596 A1 * | 3/2018 | Goransson | F16F 9/435 |
| 2020/0300329 A1 * | 9/2020 | Cotter | F16F 9/02 |

FOREIGN PATENT DOCUMENTS

| | | | | |
|---|---|---|---|---|
| EP | 3236102 A1 | | 10/2017 | |
| FR | 2821401 A1 * | | 8/2002 | F16F 9/0218 |
| JP | 2002266920 A * | | 9/2002 | F16F 9/0218 |
| WO | 20090063003 A1 | | 5/2009 | |
| WO | WO-2009063003 A1 * | | 5/2009 | F16F 9/43 |

* cited by examiner

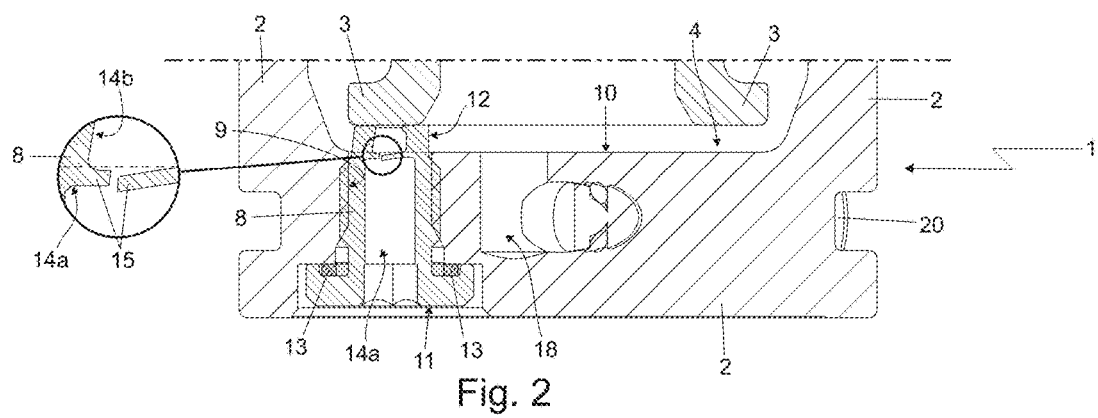
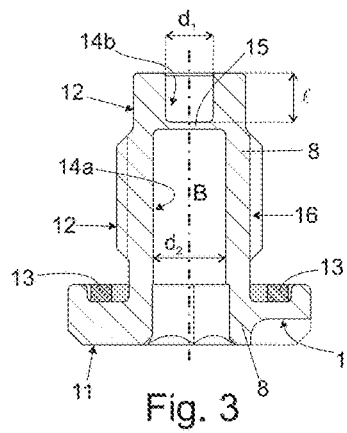
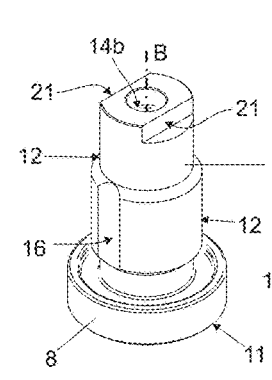
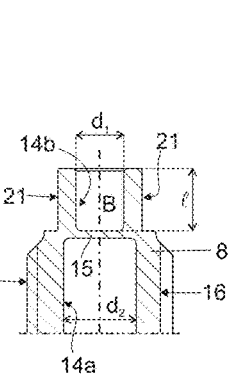
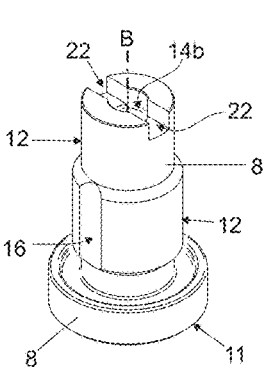
Fig. 2
Fig. 3
Fig. 4
Fig. 5
Fig. 6

GAS SPRING

CROSS-REFERENCE TO RELATED APPLICATIONS

This Patent application claims priority from Italian Patent Application No. 102021000008588 filed on Apr. 7, 2021, the entire disclosure of which is incorporated herein by reference.

TECHNICAL FIELD

The resent invention relates to a gas spring.

More in detail, the present invention relates to a gas spring adapted to be used in the sheet-metal moulding field. Use to which the following disclosure will make explicit reference without however loosing in generality.

BACKGROUND ART

As is known, gas springs that are used in moulds for sheet-metal moulding generally comprise: a cup-shaped body that is substantially cylindrical in shape; a guide bushing inserted in fluid-tight manner within the cup-shaped body, at the mouth of the cup-shaped body; and a piston substantially cylindrical in shape, which is inserted in pass-through and axially slidable manner in the hole at centre of the guide bushing, so as to be able to move with reference to the cup-shaped body parallel to the longitudinal axis of the same cup-shaped body.

The piston is moreover inserted in the guide bushing in a fluid-tight manner so as to form/delimit, together with the cup-shaped body and guide bushing, a variable-volume closed chamber, which is filled with a high-pressure gas that tends to maximise the volume of the closed chamber and, therefore, continuously pushes the piston outside of the cup-shaped body.

The piston therefore remains abutted against the guide bushing, in a completely extracted configuration, until it is subjected to an axial force able to overcome the thrust of the high-pressure gas.

In the gas springs installed in cold sheet-metal moulding presses, the gas contained in the variable-volume chamber has a nominal pressure usually ranging between 50 and 250 bar, which significantly increases when the piston is pushed inside the cup-shaped body.

Unfortunately, during the cold moulding cycles, it may happen that the piston of the gas spring remains blocked in the retracted position, or is forced to complete an axial stroke that is longer than the planned one, with all the safety problems that this entails.

In order to minimise the risks related to gas-springs malfunctioning, in recent years, the major manufacturers of gas springs have inserted, in their devices, safety systems that, when certain critical conditions occur, are able to release the gas from the cup-shaped body quickly, though in a controlled manner, so as to minimise the risks of the gas spring's explosion and/or of the piston's explosive ejection.

More in detail, in recent years, the major manufacturers of gas springs have inserted, in their devices, safety systems that are able to automatically discharge the pressurised gas present into the gas spring when the piston "overtravels", i.e. when the piston enters into the cup-shaped body beyond the maximum stroke allowed by the dimensions of the gas spring.

The gas springs described in European patents EP0959263 B1 and EP1241373 B1, for example, are provided with a mushroom-shaped safety plug, which is screwed into a through hole made in the bottom wall of the cup-shaped body.

The threaded shank of the safety plug is dimensioned so as to protrude cantilevered into the cup-shaped body, and has a blind discharge duct that extends coaxial to the longitudinal axis of the plug and is hermetically closed at the distal end of the threaded shank. The distal end of the shank is, in addition, structured so as to break in case of a collision. When the piston re-enters into the cup-shaped body beyond the permitted maximum stroke, the lower end of the piston hits/impacts against the safety plug, causing the tip of the threaded shank to break and, consequently, the opening of the discharge duct of the plug.

Unfortunately, the safety plug described above is not very reliable, because it may accidentally discharge the gas outside of the gas spring even when the gas spring is not in a critical condition.

During normal use, in fact, it often happens that the pressure of the gas inside the gas spring is lowered and temporarily brought almost to ambient pressure. In this case, the weight resting on the piston of the gas spring may be such as to push the piston against the distal end of the shank of the safety plug with enough energy to cause the deformation thereof. This deformation may, successively, lead to the accidental breakage of the tip of the shank and the ill-timed release of the gas through the central discharge duct, thus making the gas spring useless.

In PCT application WO2009/063003 A1 this drawback is overcome via the use of a safety plug wherein the central discharge duct is closed by a breakable septum which is broken by the sharp tip of a striker, which is screwed inside the discharge duct of the safety plug so as to jut out cantilevered from the threaded shank, inside the cup-shaped body. The threaded coupling between the striker and the threaded shank of the safety plug is suitably dimensioned so as to avoid the piston to accidentally break the breakable septum in case of normal depressurisation of the variable-volume closed chamber.

In addition to deactivating the gas spring in the event of overtravel, the safety device described in PCT application WO2009/063003 A1 moreover allows to deactivate the gas spring when the pressure of the gas inside the device exceeds a predetermined maximum threshold.

The breakable septum, in fact, is moreover dimensioned to automatically break when the pressure difference between the two faces of the septum exceeds a given limit value (for example 700 bar).

Unfortunately, despite being very reliable, the safety device described in PCT application WO2009/063003 A1 is made up of two separate pieces and it is relatively costly and complicated to install in the bottom of the cup-shaped body, significantly affecting the overall production costs of the gas springs.

DISCLOSURE OF INVENTION

Aim of this invention is to produce a safety plug for gas springs which may quickly discharge the pressurised gas, both in the event of overtravel and in the event of over-pressure, and which has production and installation costs lower than those of currently known safety systems.

In accordance with these aims, according to the present invention there is provided a gas spring as defined in claim 1 and preferably, though not necessarily, in any one of the claims depending thereon.

BRIEF DESCRIPTION OF THE DRAWINGS

The present invention will now be described with reference to the attached drawings that illustrate a non-limiting embodiment thereof, in which:

FIG. 2 is a front section of the lower part of the gas spring illustrated in FIG. 1, in overtravel condition and with parts in section and parts removed for clarity's sake;

FIG. 3 is a section view of the safety plug of the gas spring illustrated in FIGS. 1 and 2, with parts removed for clarity's sake; while FIGS. 4 and 5 are, respectively, a perspective view and a section view of a first variation of the safety plug shown in FIGS. 1, 2 and 3; whereas FIG. 6 is a perspective view of a second variation of the safety plug shown in FIGS. 1, 2 and 3.

BEST MODE FOR CARRYING OUT THE INVENTION

Figure 1:
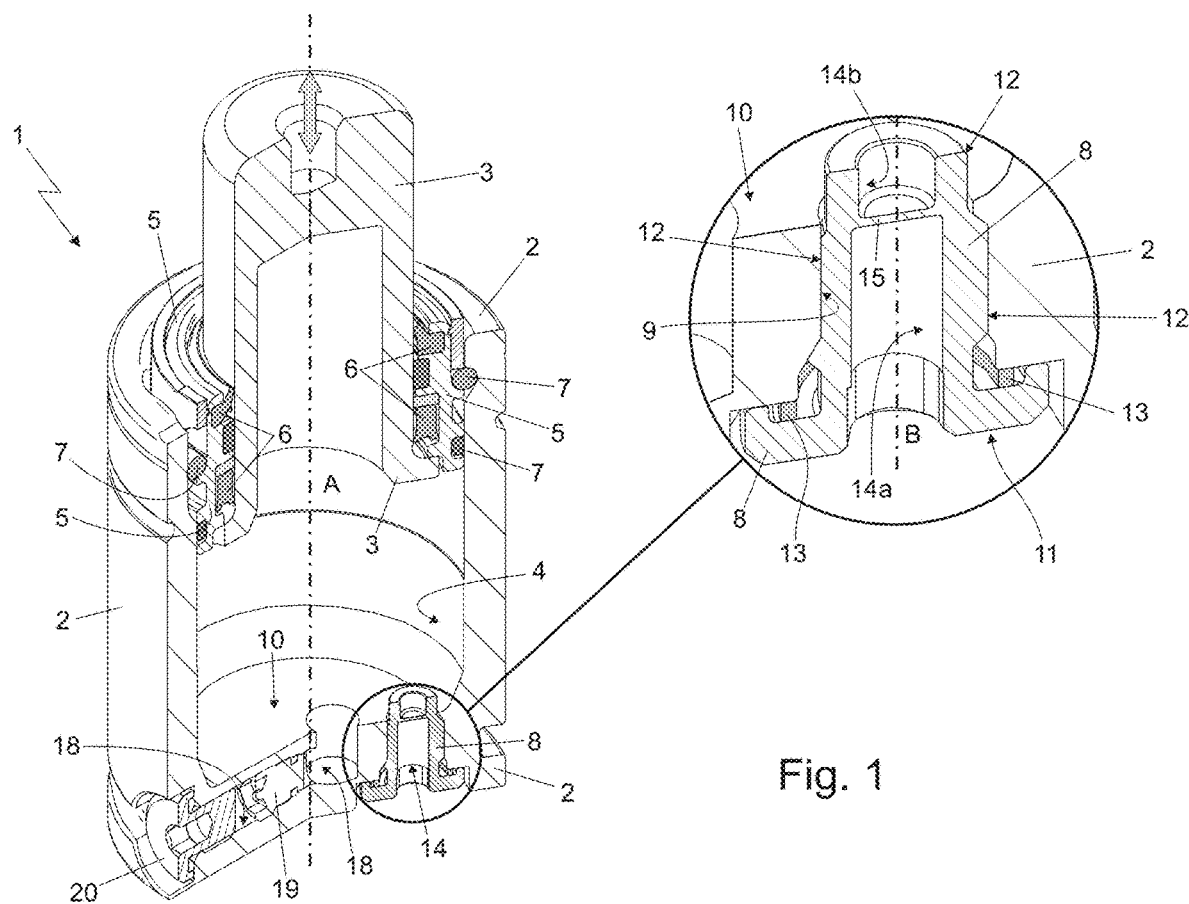
FIG. 1 is a perspective view of a gas spring realized according to the teachings of the present invention, with parts in section and parts removed for clarity's sake.

With reference to FIG. 1, number 1 denotes, as a whole, a gas spring that may advantageously be used in presses or moulds for cold sheet-metal moulding and the like.

The gas spring 1 firstly comprises: a cup-shaped body 2 preferably substantially cylindrical in shape, which is preferably made of metal and preferably has a monolithic structure; and a movable piston 3 preferably substantially cylindrical in shape, which is preferably made of metal, and is inserted in axially slidable manner into the cup-shaped body 2, so as to be able to freely move forwards and backwards with respect to the cup-shaped body 2, parallel to the longitudinal axis A of the cup-shaped body 2. The movable piston 3, in addition, is coupled to the cup-shaped body 2 in a fluid-tight manner, so as to form/delimit, inside the cup-shaped body 2, a variable-volume closed chamber 4 adapted to contain nitrogen or other pressurised gas.

More in detail, the movable piston 3 preferably has a cup-shaped structure, and is preferably fitted in axially slidable and pass-through manner into a guide bushing 5 which is preferably made of metal and, in turn, is firmly fixed into the cup-shaped body 2, preferably substantially at the mouth of the same cup-shaped body 2.

In addition, the movable piston 3 is coupled in a fluid-tight manner to the guide bushing 5 preferably via the interposition of at least one and more advantageously a number of annular sealing gaskets 6 preferably made of polymeric material.

The guide bushing 5, in turn, is coupled in fluid-tight manner to the cup-shaped body 2, or rather to the mouth of cup-shaped body 2, preferably via the interposition of at least one and more advantageously a number of annular sealing gaskets 7 preferably made of polymeric material.

Preferably the nitrogen or other gas contained in the closed chamber 4, on the other hand, has a nominal pressure ranging between 50 and 250 bar.

With reference to FIGS. 1, 2 and 3, in addition, the gas spring 1 also comprises a substantially mushroom-shaped safety plug 8, separate and distinct from the cup-shaped body 2, which is preferably made of metal, and is inserted into a through hole 9 that is made in the bottom wall 10 of the cup-shaped body 2, beneath the movable piston 3, so as to seal the through hole 9 substantially in fluid-tight manner. Preferably through hole 9 is moreover substantially parallel to the axis A of cup-shaped body 2.

More in detail, the safety plug 8 is provided with a head 11 preferably substantially discoidal in shape, and with a shank 12 substantially cylindrical in shape and at least partially threaded, which is screwed into the through hole 9 preferably so as to bring the head 11 in abutment against the bottom wall 10 of cup-shaped body 2, outside of the cup-shaped body 2. Preferably the shank 12 of safety plug 8 is, therefore, substantially parallel to the axis A of cup-shaped body 2.

Preferably at least one annular sealing gasket 13 preferably made of polymeric material, is furthermore interposed between the head 11 of safety plug 8 and the bottom wall 10 of cup-shaped body 2.

More in detail, the annular sealing gasket 13 is at least partially recessed into an annular groove suitably made in the head 11 of safety plug 8.

With reference to FIGS. 1, 2 and 3, in addition, the shank 12 of safety plug 8 is dimensioned so as to protrude cantilevered inside of the cavity of cup-shaped body 2, towards the piston 3, so that its distal end may be reached/struck by the piston 3 in the event of overtravel, i.e. when the movable piston 3 re-enters into the cup-shaped body 2 beyond the permitted maximum stroke.

In addition, the distal end of the 12 moreover has a substantially tubular structure that directly communicates with the cavity inside the cup-shaped body 2 and, thus, with the closed chamber 4.

More in detail, the shank 12 of safety plug 8 preferably has, inside itself, a longitudinal gas discharge duct 14, preferably substantially straight, which extends for the whole length of shank 12, preferably while remaining locally substantially coaxial or, in any case, parallel to the longitudinal axis B of shank 12, and is divided into two complementary and consecutive, longitudinal segments 14a and 14b via a preferably substantially plate-like, transversal breakable septum 15 that isolates/divides the two segments 14a and 14b from each other in a fluid-tight manner.

More in detail, the breakable septum 15 is preferably substantially discoidal, and is preferably substantially perpendicular and optionally coaxial to the longitudinal axis B of the shank 12.

The longitudinal segment 14a of discharge duct 14 directly communicates with the outside environment. More in detail, the longitudinal segment 14a of discharge duct 14 extends inside the shank 12, towards the head 11, preferably up to reach a hexagonal seat for hex keys or the like located at the centre of head 11.

Preferably, the longitudinal segment 14a of discharge duct 14 moreover has a clear section that is greater than that of the longitudinal segment 14b.

The longitudinal segment 14b of discharge duct 14, in turn, ends at the distal end of shank 12 and directly communicates with the inside of cup-shaped body 2 and, thus, with the closed chamber 4.

Preferably, the length of the longitudinal segment 14b of discharge duct 14 is moreover shorter than that of the longitudinal segment 14a, so that the breakable septum 15 is located close to or inside the closed chamber 4.

In other words, the longitudinal segment 14a is longer than the longitudinal segment 14b.

More in detail, the length of the longitudinal segment 14b of discharge duct 14 is preferably less than 40% of the overall length of the discharge duct 14.

Even more in detail, the length of the longitudinal segment 14b of discharge duct 14 is preferably shorter than or equal to 50% of the length of the longitudinal segment 14a.

In other words, the length of the longitudinal segment 14b of discharge duct 14 is preferably less than or equal to one third (⅓) of the overall length of discharge duct 14.

In addition, the breakable septum 15 is preferably located along the portion of shank 12 sticking out cantilevered inside the cavity of cup-shaped body 2.

In other words, the length □ of the longitudinal segment 14b of discharge duct 14 is preferably shorter or equal to the length of the portion of shank 12 sticking out cantilevered inside the cavity of cup-shaped body 2.

In the example shown, in particular, the breakable septum 15 preferably has a thickness less than or equal to 1 mm (millimetre), and is preferably located inside the shank 12 of safety plug 8 so as to be substantially aligned/coplanar with the inner surface of the cavity of cup-shaped body 2.

The longitudinal segment 14b of discharge duct 14, therefore, is preferably delimited by the whole portion of shank 12 that sticks out cantilevered inside of the cup-shaped body 2, whereas the longitudinal segment 14a is preferably delimited by the portion of shank 12 that stably engages the through hole 9 made in the bottom wall 10 of cup-shaped body 2.

Clearly, the breakable septum 15 may also be located along the portion of shank 12 sticking out cantilevered inside the cavity of cup-shaped body 2, at a given distance (for example 2 mm) from the inner surface of the cup-shaped body 2.

With reference to FIGS. 1 and 3, preferably first 14a and second 14b longitudinal segments of discharge duct 14 have both a substantially circular cross-section. In addition, the nominal diameter $d_1$ of the longitudinal segment 14b of discharge duct 14 is smaller than the nominal diameter $d_2$ of the longitudinal segment 14a.

More in detail, the nominal diameter $d_1$ of longitudinal segment 14b is preferably at least 10% smaller than the nominal diameter $d_2$ of longitudinal segment 14a.

Even more in detail, in the example shown the nominal diameter $d_1$ of longitudinal segment 14b is preferably at least 30% smaller than the nominal diameter $d_2$ of longitudinal segment 14a.

In the example shown, in addition, the length □ of the longitudinal segment 14b of discharge duct 14 preferably ranges between 1 and 15 mm (millimetres).

The breakable septum 15, in addition, is preferably dimensioned so as to automatically break/fracture/detach when the pressure difference between the two faces of the septum exceeds a pre-set limit value that, in the example shown, is preferably, though not necessarily, equal to or greater than 700 bar.

With particular reference to FIG. 3, preferably the shank 12 of safety plug 8 finally has, on the outside, a preferably substantially straight, longitudinal groove 16 that crosses roughly the whole threaded portion of shank 12, preferably while remaining locally substantially parallel to the longitudinal axis B of shank 12.

In addition, a portion of the head 11 of safety plug 8 preferably has a controlled-deformation structure, which enables the discoid head 11 to locally deform/bend towards the outside when the pressure of the gas exceeds a second pre-set limit value, so as to allow the release of the pressurised gas from the cup-shaped body 2. Preferably the second limit value is moreover greater than the first limit value associated with the breakable septum 15.

Clearly, the second limit value could also be lower than or equal to the first limit value.

In the example shown, in particular, the second limit value is preferably, though not necessarily, equal to or greater than 750 bar.

More in detail, in the example shown, the safety plug 8 has, on the discoid head 11, a transversal weakening groove or flattened portion 17.

With reference to FIGS. 1 and 2, preferably the cup-shaped body 2 is finally provided with a gas supply duct 18, which extends in pass-through manner across the bottom wall 10 and/or the lateral wall of cup-shaped body 2, so as to place its internal cavity, and thus the closed chamber 4, in direct communication with the outside.

Preferably, the gas spring 1 finally comprises also: a check valve 19 that is placed along the supply duct 18 and is oriented so as to allow the gas to solely flow in direction of the inner cavity of the cup-shaped body; and/or a closing plug 20 preferably of removable type, which is placed at the mouth of supply duct 18 and is preferably adapted to close/seal the supply duct 18 substantially in fluid-tight manner.

General operation of gas spring 1 is easily inferable from the above and therefore does not require further explanations.

As regards, on the other hand, the safety plug 8, with reference to FIG. 2, in the event of overtravel, the lower edge of piston 3 strikes/impacts onto the distal end of shank 12, causing the deformation of the portion of shank 12 sticking out cantilevered inside the cavity of cup-shaped body 2. This deformation causes, in turn, the cracking, partial detachment or entire breakage of the breakable septum 15, with the consequent opening of the discharge duct 14 and release of the pressurised gas from the closed chamber 4 through the discharge duct 14.

In addition or alternatively, the impact of piston 3 on the distal end of shank 12 may create, on the portion of the shank 12 sticking out cantilevered inside the cavity of cup-shaped body 2, small through cracks and/or fissures putting the longitudinal segment 14a of discharge duct 14 in direct communication with the cavity of cup-shaped body 2, with the consequent opening of the discharge duct 14 and release of the pressurised gas from the closed chamber 4 through the discharge duct 14.

In both cases, therefore, the piston 3 does not come in direct contact with the breakable septum 15.

In conditions of excessive pressure, on the other hand, the difference in pressure between the two faces of the breakable septum 15 causes the cracking or entire breakage of the breakable septum 15, with the consequent opening of the discharge duct 14 and release of the pressurised gas from the closed chamber 4.

In addition, experimental tests have shown that the tubular structure of the distal end of shank 12 gives the same end a structural stiffness sufficient to support, when the variable-volume closed chamber 4 of gas spring 1 is temporarily depressurised for use and/or maintenance requirements, the weight of piston 3 without being subjected to deformations that could compromise the structural integrity of the beneath-located breakable septum 15.

The advantages connected to the particular structure of the distal end of the shank 12 of the safety plug 8 are noteworthy.

With equal performance with respect to the system described in PCT patent application WO2009/063003 A1, the safety plug 8 is made in one piece and is very easy to fix on the bottom wall 10 of cup-shaped body 2.

In addition, in event of overpressure, the safety plug 8 offers two possible alternative way outs for the discharge of the pressurised gas, with the greater intrinsic safety that this entails.

It is finally clear that modification and variant may be made to the gas spring 1 described above without however departing from the scope of the present invention.

For example, the breakable septum 15 may also be located along the part of shank 12 remaining inside the thickness of the bottom wall 10 of cup-shaped body 2, provided that the deformation of the distal end of shank 12 caused by the overtravel of piston 3 is still able to cause the cracking, partial detachment, or entire breakage of the breakable septum 15.

In addition, with reference to FIGS. 4 and 5, in a more sophisticated embodiment, the shank 12 of safety plug 8 preferably has, at its distal end, one or more external/peripheral weakening notches, grooves, or flattened portions that are made beside to the mouth of the longitudinal segment 14b of discharge duct 14. Preferably the weakening notch/es, groove/s, or flattened portion/s are moreover made via milling or other material-removal mechanical processing.

In the example shown, in particular, the distal end of shank 12 preferably has two weakening flattened portions 21 that are arranged in a substantially diametral position, on opposite sides of the mouth of the longitudinal segment 14b.

Preferably at least one and more advantageously each of the weakening flattened portions 21 is preferably shaped substantially like a circular segment.

With reference to FIG. 5, preferably the weakening flattened portion/s 21 moreover extend outside of the shank 12, towards the head 11 of safety plug 8, substantially for the whole length □ of the longitudinal segment 14b of discharge duct 14, so as to arrive in correspondence the breakable septum 15.

With reference to FIG. 6, in a further embodiment, the distal end of the shank 12 of safety plug 8 has a diametral cut 22 that intersects the mouth of the longitudinal segment 14b of gas discharge duct 14, and is preferably made via milling or other material-removing mechanical process.

The invention claimed is:

1. A gas spring (1) comprising: a cup-shaped body (2); a movable piston (3) which is inserted in axially slidable manner in the cup-shaped body (2) and is coupled to the cup-shaped body (2) in a fluid-tight manner, so as to delimit a variable-volume closed chamber (4) adapted to contain a pressurized gas; and a safety plug (8) provided with a shank (12) which extends in pass-through manner in a bottom wall (10) of the cup-shaped body (2), and protrudes cantilevered within the cup-shaped body (2) so that its distal end can be reached/struck by the movable piston (3) in the case of overtravel;

the gas spring (1) being characterized in that the shank (12) of the safety plug (8) has, inside itself, a gas discharge duct (14) which is divided into a first longitudinal segment (14a) and a second longitudinal segment (14b) by means of a breakable septum (15) that isolates/divides said longitudinal segments (14a, 14b) one from the other in a fluid-tight manner; wherein the second longitudinal segment (14b) of the gas discharge duct (14) ends at the distal end of said shank (12) so as to communicate directly with the closed chamber (4); and wherein the length of the second longitudinal segment (14b) of discharge duct (14) is shorter than that of the first longitudinal segment (14a), so that the breakable septum (15) is located close to or inside said closed chamber (4), wherein the breakable septum (15) is adapted to automatically break, fracture, or detach while free from contact of any structural component when the pressure difference between the two faces of the septum exceeds a predetermined limit value, and wherein the breakable septum (15) cracks, partially detaches or entirely breaks at least in part from a deformation at the distal end of the shank (12) when the movable piston (3), in the case of overtravel, impacts the distal end of the shank (12) without direct contact with the breakable septum (15).

2. The gas spring according to claim 1, wherein the breakable septum (15) is located along the portion of the shank (12) that protrudes cantilevered inside the cup-shaped body (2).

3. The gas spring according to claim 1, wherein the breakable septum (15) is substantially plate-like.

4. The gas spring according to claim 1, wherein the first longitudinal segment (14a) of the gas discharge duct (14) has a clear section larger than that of the second longitudinal segment (14b) of the gas discharge duct (14).

5. The gas spring according to claim 4, wherein the first (14a) and the second (14b) longitudinal segments of the gas discharge duct (14) have both a substantially circular cross-section.

6. The gas spring according to claim 5, wherein the diameter ($d_1$) of the second longitudinal segment (14b) is smaller than the diameter ($d_2$) of the first longitudinal segment (14a).

7. The gas spring according to claim 6, wherein the diameter ($d_1$) of the second longitudinal segment (14b) of the gas discharge duct (14) is at least 10% smaller than the diameter ($d_2$) of the first longitudinal segment (14a).

8. The gas spring according to claim 1, wherein the shank (12) has, at its distal end, one or more weakening notches, grooves, flattened portions and/or cut-outs.

9. The gas spring according to claim 8, wherein the shank (12) has, at its distal end, a pair of weakening flattened portions (21) that are arranged in substantially diametral positions, on opposite sides of the mouth of the second longitudinal segment (14b) of the gas discharge duct (14).

10. The gas spring according to claim 9, wherein at least one of the weakening flattened portions (21) extends along the shank (12) towards a head (11) of the safety plug (8) so as to arrive at the breakable septum (15).

11. The gas spring according to claim 8, wherein the shank (12) has, at its distal end, a diametral cut (22) that intersects the mouth of the second longitudinal segment (14b) of the gas discharge duct (14).

12. The gas spring according to claim 1, wherein the length of the second longitudinal segment (14b) of the discharge duct (14) is less than 40% of the overall length of the same discharge duct (14).

13. The gas spring according to claim 3, wherein the breakable septum (15) is substantially discoidal in shape.

14. The gas spring according to claim 1, wherein the breakable septum (15) is located close to or inside the closed chamber (4).

15. The gas spring according to claim 1, wherein the breakable spectrum (15) is located inside the shank (12) of safety plug 8 so as to be substantially coplanar with an inner surface of the cup-shaped body (2).

16. The gas spring according to claim 2, wherein the breakable septum 15 is located at about 2 millimeters (mm) from an inner surface of the cup-shaped body 2.

17. The gas spring according to claim 1, wherein the safety plug (8) comprises a transversal groove or flattened portion (17) on a discoidal head (11).

18. The gas spring according to claim 1, wherein the septum extends across the gas discharge duct and the piston is configured such that a bottom edge thereof impacts the distal end of the shank but is oversized relative to the gas discharge duct and is prevented from entering the gas discharge duct and making contact with the septum.

\* \* \* \* \*